May 19, 1931.   S. W. BORDEN   1,805,754
ELECTRICAL CONNECTING DEVICE FOR ELECTRICAL CONDUCTORS
Filed April 8, 1926   2 Sheets-Sheet 1
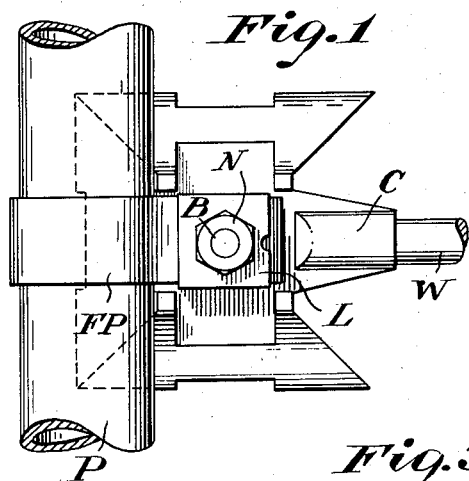
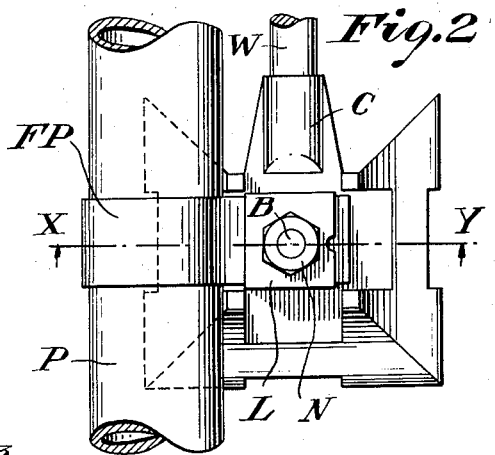
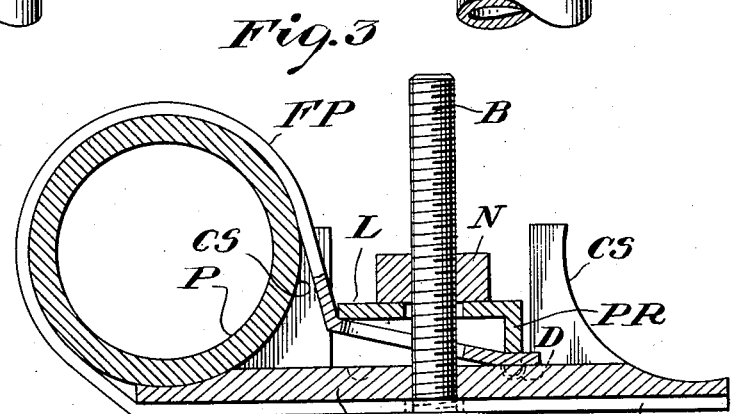
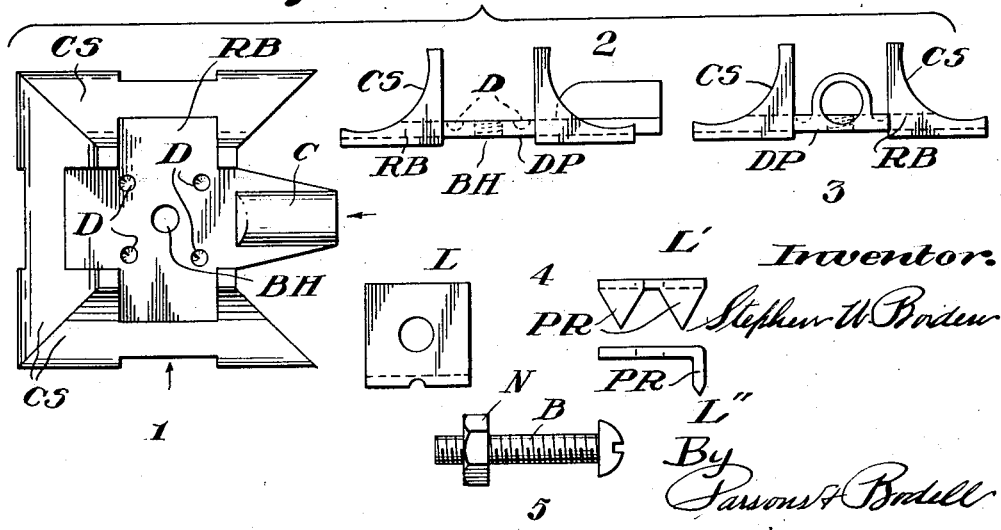

May 19, 1931. S. W. BORDEN 1,805,754
ELECTRICAL CONNECTING DEVICE FOR ELECTRICAL CONDUCTORS
Filed April 8, 1926 2 Sheets-Sheet 2
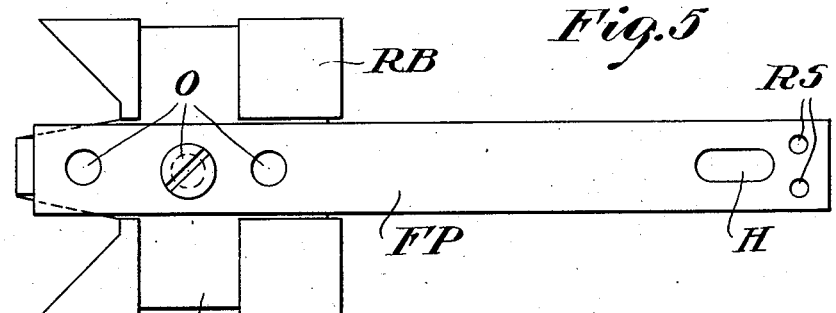
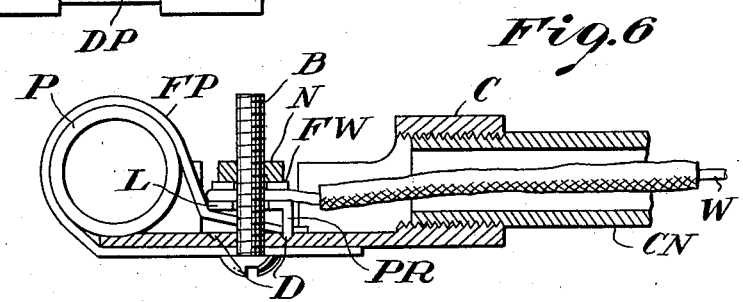
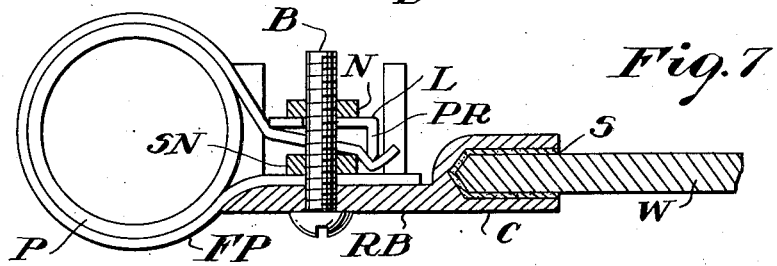
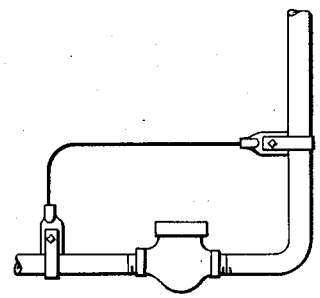
Inventor:
Stephen W. Borden
By
Parsons & Bodell
Attorneys.

Patented May 19, 1931

1,805,754

UNITED STATES PATENT OFFICE

STEPHEN W. BORDEN, OF SUMMIT, NEW JERSEY, ASSIGNOR, BY MESNE ASSIGNMENTS, TO CROUSE-HINDS COMPANY

ELECTRICAL CONNECTING DEVICE FOR ELECTRICAL CONDUCTORS

Application filed April 8, 1926. Serial No. 100,683.

This invention relates to improvements in electrical connecting devices and more particularly to connecting devices for connecting together two electrical conductors where the connection is to be made to an end of one conductor but to some other portion of a second conductor, as, for instance where no end of said second conductor is available for connection purposes.

The objects of the improvements are to improve such electrical connecting devices in general and particularly to provide first, a suitable structure for fastening the two said conductors rigidly together, mechanically, as well as connecting them together electrically; second, to provide facilities for locating the two conductors in more than one position with respect to each other; and third, to reduce the friction and increase the holding power of the strap attaching means.

The invention comprises the connecting devices described and claimed hereinafter in connection with the drawings and equivalents thereof, of which Fig. 1 is a top plan view of a preferred form of my connector and showing two connected conductors, P and W, lying at right angles to each other;

Fig. 2 is the same as Fig. 1 except that the conductors are parallel;

Fig. 3 is a cross section on line xy of Fig. 2, enlarged, and showing in detail the application of pressure locking device L;

Fig. 4 shows the various parts of the connector and in which

1—is a top plan view of the rigid base of the fitting

2—is a front elevation of Fig. 1 looking with the arrow

3—is an end elevation of Fig. 1 looking with the arrow

4L—4L'—4L''—are plan, end and side elevations of the pressure locking device L

5—is the bolt and nut;

Fig. 5 is a bottom view of the rigid base, RB, with the flexible portion, FP, attached at one end;

Fig. 6 is a cross section showing the connector designed to receive a conduit containing a wire connected to the connector;

Fig. 7 is a cross section of a non-preferred form of my connector showing the flexible portion attached to the inner side of the rigid base;

Fig. 8 is a perspective view of a water meter shunt embodying two of my connectors.

In all drawings like parts are indicated by like symbols.

The principal features of my connector are a rigid base, RB, one portion, C, of which is hollow; a flexible portion, FP, and suitable means for connecting the respective ends of flexible portion, FP, to rigid base, RB; in such manner that said part, RB, shall be placed in rigid mechanical relation to the electrical conductor surrounded by flexible portion, FP; the design which permits the connector to be turned into a plurality of angular positions, here shown as three so that the conductor W may lie in different angular positions, here illustrated as either at right angles with or parallel to the conductor P and when parallel, may lie either to the right or left; and the pressure locking device L, which makes it possible to place the flexible portion, FP, under a relatively heavy pressure without undue friction of the various parts which must move when such pressure is applied, and without tearing the flexible portion, FP. Thus the rigid base RP is a head provided with a plurality of sides thrusting against and for interchangeable engagement with a grounded element, as a water pipe P.

The base of the fitting, RB, must be of conducting material and may be a casting or be formed from heavy sheet metal, but must be of sufficiently rigid construction to withstand distortion from any strain which might be imposed by any normal movement of either of the conductors connected thereto. One end and the sides of the base have curved outer surfaces, CS, designed to conform sufficiently to the surface of a circular conductor, when clamped thereto, to prevent its slipping out of place. In the center of the base is a threaded hole to receive the bolt B. The portion C is tubular and hollow to receive a conductor as W, which is soldered or welded therein, although it is understood that this may be threaded to receive a threaded conductor, either of solid or tubular construction, or a conduit containing a conductor, the latter type of construction being shown in Fig. 6. In the construction shown in Figure 6, the electric conductor or wire W is bound to the base or body RB by the same clamping means that secures the strap FP around the grounded element or conductor P, as the nut N on the bolt or stud B serves to bind the end of the wire against the clamping plate or lever L, and hence this construction constitutes a single means for tightening the clamp or plate L and for binding the wire W to the fitting.

The dimensions of the base and its form are such that the surfaces of one end and the two sides are substantially of the same form (preferably concave to conform to and form seats for the curved surface of the conductor), this being necessary in order that any one of the three sides of the base RB may be brought into proper relationship with the conductor P using for the purpose, in each case, one and the same flexible portion and connecting means. However, the base may be constructed with but one or two clamping surfaces instead of three or more, a connector of the first type being shown in Fig. 8.

The flexible portion, FP, Fig. 5, consists of a strip or strap of flexible metal having non-rusting characteristics such as copper or aluminum. One end of the strap contains a hole, H, through which the fastening bolt or stud passes. This hole is preferably, but not necessarily, oblong in shape as this form is more easily installed. The two holes, RS, may be of any shape and are designed as openings through which the prongs of pressure device L, Fig. 3, may pass. In a non-preferred form, however, they may be merely depressions of sufficient depth and form to prevent the prongs of part L from slipping. The other end of the strap contains one or more holes as O, through one of which the bolt B passes, thus securing the strap to RB. The particular hole selected depends upon the diameter of the conductor which the strap is to encircle. The strap may be as long as desired and may contain as many holes as desired, but if the holes run together or a slot is used in place of the holes, additional means must be provided to prevent the strap from slipping. It will be observed by reference to Fig. 5 that the strap may be installed with the free end extending in the direction shown or at right angles thereto, and to either the right or the left. In order to change from one position to another it is merely necessary to unscrew the bolt a few turns, turn the strap as desired and retighten the bolt.

The normal application of the connector is as follows. The flexible portion, FP, is attached to the base in the position desired, depending upon whether the conductors are to be connected at right angles or otherwise, and the end of one conductor is soldered or welded into the portion C. When the connector with its attached conductor W has been drawn against the outer surface of conductor P, the flexible portion FP, is wrapped around conductor P and passed over bolt B by means of a suitable hole as H, Fig. 5. The locking device L is then passed over the bolt and forced downward by the nut N. As the nut N is screwed on to bolt B the locking device L draws the flexible portion FP tightly around the conductor P and at the same time and for the same reason, draws the base RB rigidly against the side of conductor P.

The locking device L in effect is a plate having a lever action fulcrumed on the body and bearing on the loop of the strap at spaced apart points with the force applied to tighten the strap applied to the lever or plate between said points; and the lever, plate or locking device coacts with the loop of the strap at practically any point along the strap. The prongs PR at the fulcrum end of the lever or plate interlock with the strap at practically any point along the length of the strap, the plate pressing against the strap between the loop and the point at which it is interlocked with the strap, during the clamping of the plate, and the intermediate point of the plate to which the clamping force is applied, is spaced apart from the strap permitting the lever action. Preferably, the prongs coact with depressions or seats D in the body RB and underlying the end of the strap lapping the body RB. The plate or lever thus fulcrums on the body in the depressions D.

When the nut N has been forced down sufficiently far to secure the necessary tightness desired, the strain upon the flexible portion FP is very considerable and if the entire strain is taken by the strap at the point where the bolt passes through it, I know from experience that a copper or aluminum strap will tear or cut at this point due to the strain and the fact of its being forced along the threaded bolt. In order to overcome this difficulty I have designed the locking device L which is shown in detail in Fig. 4 and on a larger scale in Fig. 3. As the locking device descends the two prongs PR, pass through the holes, RS, in the flexible portion, FP, and enter the holes or depressions D in the base RB, so that the strap is held from traveling backward against the bolt B as the nut is forced down, thus preventing the tearing of the strap by the bolt as the bolt now passes through the strap without necessarily touching it at all.

While not illustrated in the drawings, it is quite obvious that should it be desired to enclose the connections after they are made up, this may be done by a simple sheet metal cover fitting over the outside of the entire fitting and having a hole in the center through which the top of the bolt B would pass, the same being held in place by an additional nut on the top of the bolt B.

It has already been pointed out that one end of the flexible portion is attached to the base RB before the flexible portion is passed around conductor P. This is an important feature since both conductors P and W may be in more or less fixed positions and as a practical matter, it would be difficult to assemble the flexible portion around the conductor P and attach it to base RB, if both ends were free during the installing process, which would be the case if the bolt B were replaced by a cap screw inserted from the top and screwed into a threaded hole in the base of the connector. If the flexible portion is attached to the base by a second and independent fastening device such as a second screw, it would then be necessary to provide three additional threaded holes to accommodate this separate attaching means for the three different positions which the flexible portion might assume with respect to the base, thus detracting somewhat from the convenience of installation and adding to the cost.

An important feature of my connector is that irrespective of whether the connected conductors are parallel to each other or otherwise, the rigid base of the connector is always brought into direct mechanical contact with the conductor P, no portion of the relatively soft flexible part, FP, being interposed at any time between the rigid part RB of my connector and the conductor P.

In Fig. 8 is shown a meter shunt generally used in the art for connecting together the water pipes on either side of a water meter, this being a requirement of the National Electrical Code and the National Electrical Safety Code for certain classes of construction. Both the conductor itself and the connectors must be of sufficiently rigid construction to prevent injury by such mechanical abuse as they would be subject to in a normal installation. In a meter shunt which I have designed the conductor consists of a #4 B. & S. gauge steel wire with a welded copper jacket, commonly known as copperweld wire. This wire has such characteristics that it cannot be materially injured or broken except by deliberate intent and with tools designed for the purpose, but it often is displaced by plumbers in moving or installing a meter or accidentally, and when so displaced a very considerable mechanical strain is placed upon the terminal fittings and it is essential that these fittings be so designed that they will not be displaced or their relation with respect to the pipe changed or the electrical connections in any way displaced or loosened by the usage referred to. The connector which I have described fulfills these requirements and is therefore a suitable terminal fitting for such a shunt and a great many have been used by me in connection with the manufacture of water meter shunts such as described, but it is of course understood that this is but one of many applications of this type of connector.

I claim:

1. An electrical connecting device comprising a rigid portion and a conductor clamping portion and means for connection to another conductor, the rigid portion having means on a plurality of sides thereof for interchangeably engaging and thrusting against the conductor and the clamping member being adjustable into juxtaposition to any one of said sides.

2. An electrical connecting device comprising a rigid portion and a conductor clamping portion and means for connection to another conductor, the rigid portion, having means on a plurality of sides thereof for interchangeably engaging and thrusting against the conductor and the clamping member being adjustable into juxtaposition to any one of said sides, the rigid portion being also provided with means for connection to a second conductor.

3. An electrical connecting device comprising a rigid body and a flexible strap, one end of the body being constructed to abut against an electrical conductor, one end of the strap being anchored to the body, the other end portion being free to encircle the conductor with its extreme end part extending at an angle to its loop and overlying the body, means for clamping the extreme end part toward the body including a stud member on the rigid body, a clamping member in the form of a lever having an opening through which the stud member extends and having a fulcrum arranged to clamp the free end of the strap against the body at a point remote from the loop, and the lever engaging the free end portion of the strap adjacent the loop, and a nut threading on the stud against the lever, the body having a depression and the lever operating to depress the free end part of the strap into the depression at the fulcrum point of the lever.

4. An electrical connecting device comprising a rigid body and a flexible strap, one end portion of the strap being anchored to the body and the other end portion of the strap being left free to encircle an electrical conductor with its extreme end part overlying the body and extending outwardly at an angle to the loop part, and means for contracting the strap tightly around the conductor comprising a plate having means for interlocking with the strap, and a clamping instrumentality for clamping the plate and portion of the strap interlocked with the strap toward the body.

5. An electrical connecting device comprising a rigid body and a flexible strap, one end portion of the strap being anchored to the body and the other end portion being left free to encircle an electrical conductor with its extreme end part overlying the body and extending outwardly at an angle to the loop part, and means for contracting the strap tightly around the conductor comprising a plate having an angular projection for interlocking with the strap and an instrumentality for clamping the plate and the free end of the strap toward the body.

6. An electrical connecting device comprising a rigid body and a flexible strap, one end portion of the strap being anchored to the body and the other end portion being left free to encircle an electrical conductor with its extreme end part overlying the body and extending outwardly at an angle to the loop part, and means for contracting the strap tightly around the conductor comprising a plate having a projection for interlocking with the strap and interlocking the strap with the body after the plate is clamped to the body and an instrumentality for clamping the plate and contiguous part of the strap toward the body.

7. An electrical connecting device comprising a rigid body and a flexible strap, one end portion of the strap being anchored to the body and the other end portion being left free to encircle an electrical conductor with its extreme end part overlying the body and extending outwardly at an angle to the loop part, and means for contracting the strap tightly around the conductor comprising a plate having an angular projection to interlock with the strap during the clamping of the plate, the body having a seat arranged in line with said projection and on the opposite side of the contiguous part of the strap to that on which the plate is located, and an instrumentality for clamping the plate toward the body.

8. An electrical connecting device comprising a rigid body and a flexible strap, one end portion of the strap being anchored to the body and the other end portion being left free to encircle an electrical conductor with its extreme end part overlying the body and extending outwardly at an angle to the loop part, and means for contracting the strap tightly around the conductor comprising a plate having means for interlocking with the strap at practically any point along the length of the strap.

9. An electrical connecting device comprising a rigid body and a flexible strap, one end portion of the strap being anchored to the body and the other end portion being left free to encircle an electrical conductor with its extreme end part overlying the body and extending outwardly at an angle to the loop part, and means for contracting the strap tightly around the conductor comprising a plate having means for interlocking with the strap at practically any point along the length of the strap, the plate pressing against the strap between the loop and the point at which it is interlocked with the strap during the clamping of the plate, and means for clamping the plate.

10. An electrical connecting device comprising a rigid body and flexible portion, one end of the body being constructed to abut against an electrical conductor, one end of the flexible portion being anchored to the body and the other end being free and arranged to encircle the conductor with its extreme end part lapping the body near the point where the flexible portion is anchored to the body, and means for contracting the flexible portion of the conductor against the body including a clamping member having spaced apart portions arranged to engage the free end part of the flexible portion and hold the same against the body at a point remote from the conductor and to engage the loop of the flexible portion near the conductor, the part of the clamping member intermediate said spaced apart portions being spaced apart from the underlying flexible portion.

11. An electrical connecting device comprising a rigid body and flexible portion, one end of the body being constructed to abut against an electrical conductor, one end of the flexible portion being anchored to the body and the other end being free and arranged to encircle the conductor with its extreme end part lapping the body near the point where the flexible portion is anchored to the body, and means for contracting the flexible portion of the conductor against the body including a clamping member having spaced apart portions arranged to engage the free end part of the flexible portion and hold the same against the body at a point remote from the conductor and to engage the loop of the flexible portion near the conductor, the part of the clamping member intermediate said spaced apart portions being spaced apart from the underlying flexible portion and means coacting with the intermediate portion of the clamping member, whereby the clamping member acts as a lever to engage the flexible portion at the fulcrum of the lever and at a point remote from the fulcrum.

12. An electrical connecting device comprising a rigid body and a strap, one end of the body being formed to abut against an electrical conductor, one end portion of the strap extending along the body in a general tangential direction to the conductor and being anchored to the body end, the other end portion of the strap being left free and arranged to encircle the conductor with its end part in a position to overlie the body, and a clamping member in the form of a lever arranged to engage the free end of the strap at spaced apart points and being spaced apart from the strap between said points and means acting on the lever between said spaced apart points for tightening the lever of the strap.

13. An electrical connecting device comprising a rigid body and a flexible strap, one end of the body being constructed to abut against an electrical conductor, one end of the strap being anchored to the body, the other end portion being free to encircle the conductor with its extreme end part extending at an angle to its loop and overlying the body, means for clamping the extreme end portion toward the body including a stud member on the rigid body, a clamping member in the form of a lever having an opening through which the stud extends and also having a fulcrum arranged to clamp the free end of the strap against the body and for engaging the loop of the strap at a point remote from the fulcrum, the engaging points being located on opposite sides of the stud, and one of them projecting at an angle from the lever, whereby the portion of the lever through which the stud extends is spaced apart from the strap and a nut threading on the stud against the lever.

14. In a ground fitting for connection between a conduit and a grounded element, a body member formed at one end with a grounded element engaging head, said head provided with an element receiving seat across the outer end thereof, and an element receiving seat along one side thereof, and means for securing said head to a grounded element with the element received in one of said seats.

15. In an electrical ground connection, the combination of a conduit, a conductor wire extending therethrough, and a grounding element, a body portion, means for clamping one end of the conduit on the rear end portion of the body, a flexible metallic strip encircling the grounding element, means for securing the free ends of the strip to the other end portion of the body, the free end of the conductor wire being clamped in engagement with the ends of said strip, and means formed on the forward end portion of the body whereby the same may be disposed either at right angles or parallel to the grounding element, said last mentioned means comprising laterally extending members formed on the sides and forward end portion of the body, for engagement with the grounding element to prevent lateral movement of the body portion with respect to the grounding element.

16. A ground fitting for attachment between and electrically connecting a conduit and a grounded element, said fitting including a grounded element engaging head portion provided with grounded element receiving seats at an angle to each other, and means for securing said head portion to a grounded element.

17. A ground fitting for attachment between and electrically connecting a conduit and a grounded element and for electrically connecting a wire, protruding from said conduit, to the conduit and the grounded element, which includes a grounded element engaging head portion provided with grounded element receiving seats at an angle to each other, and a clamp for securing said head portion to the grounded element and including also a single means for tightening the clamp and for connecting said wire to the fitting.

In testimony whereof I have signed my name to this specification.

STEPHEN W. BORDEN.